United States Patent [19]

Kumada

[11] Patent Number: 4,868,446
[45] Date of Patent: Sep. 19, 1989

[54] PIEZOELECTRIC REVOLVING RESONATOR AND ULTRASONIC MOTOR

[75] Inventor: Akio Kumada, Toride, Japan

[73] Assignee: Hitachi Maxell, Ltd., Osaka, Japan

[21] Appl. No.: 174,413

[22] Filed: Mar. 28, 1988

Related U.S. Application Data

[63] Continuation-in-part of Ser. No. 145,987, Jan. 20, 1988.

[30] Foreign Application Priority Data

| Jan. 22, 1987 | [JP] | Japan | 62-11373 |
| Jan. 22, 1987 | [JP] | Japan | 62-11374 |
| Jan. 22, 1987 | [JP] | Japan | 62-11375 |
| Mar. 27, 1987 | [JP] | Japan | 62-71594 |
| Mar. 27, 1987 | [JP] | Japan | 62-71595 |

[51] Int. Cl.$^4$ .................................. H01L 41/08
[52] U.S. Cl. ................................. 310/323; 310/328; 310/366; 310/369
[58] Field of Search ............... 310/323, 328, 366, 369, 310/330–333

[56] References Cited

U.S. PATENT DOCUMENTS

| 2,439,499 | 4/1948 | Williams | 310/331 |
| 3,351,393 | 11/1967 | Emmerich | 310/332 X |
| 4,453,103 | 6/1984 | Uishneusky et al. | 310/323 |
| 4,562,374 | 12/1985 | Sashida | 310/328 |
| 4,633,204 | 12/1986 | Gounji et al. | 310/366 X |
| 4,634,916 | 1/1987 | Okada et al. | 310/323 |
| 4,705,980 | 11/1987 | Mishiro | 310/323 |
| 4,734,610 | 3/1988 | Okumura et al. | 310/328 |
| 4,757,223 | 7/1988 | Ueyama | 310/328 X |

FOREIGN PATENT DOCUMENTS

| 278274 | 8/1970 | U.S.S.R. | 310/333 |
| 0845198 | 7/1981 | U.S.S.R. | 310/328 |
| 0851561 | 7/1981 | U.S.S.R. | 310/328 |
| 0851565 | 7/1981 | U.S.S.R. | 310/328 |

OTHER PUBLICATIONS

Nikkei Mechanical-1986, pp. 95-98.

Primary Examiner—Mark O. Budd
Attorney, Agent, or Firm—Antonelli, Terry & Wands

[57] ABSTRACT

A piezoelectric revolving resonator comprising a circular or cylindrical transducer element, in which the center of gravity of the resonator revolves eccentrically around the center of an original circle as a result of resonance thereof upon excitation of the 1st order resonance frequency. Also, the ultrasonic motor is disclosed comprising a resonator of gravity center revolution type with the center of gravity thereof revolving in reversibly clockwise or counterclockwise direction and a rotor pressure fitted on the resonator, the motor utilizing the rotational torque received by the motor through a frictional force.

10 Claims, 17 Drawing Sheets

F I G. 15
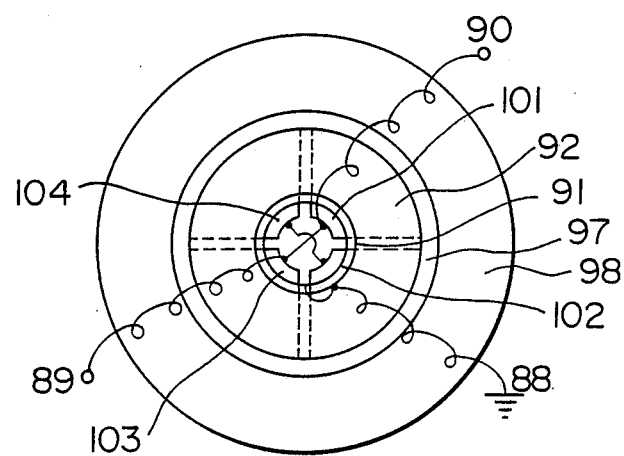
F I G. 16
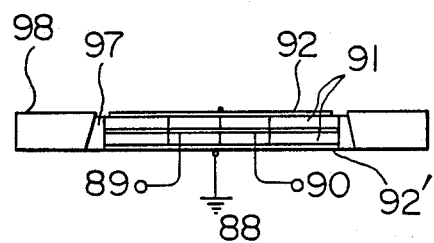

F I G. 29
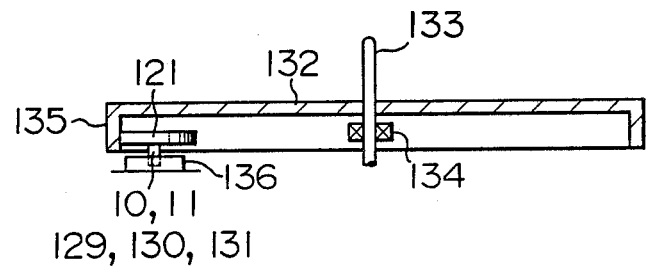
F I G. 30
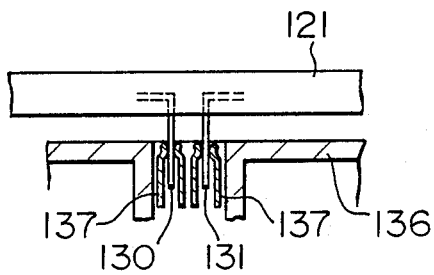
F I G. 31
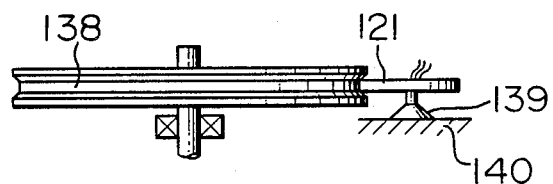

F I G. 32
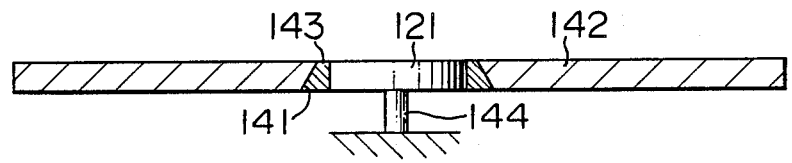
F I G. 33
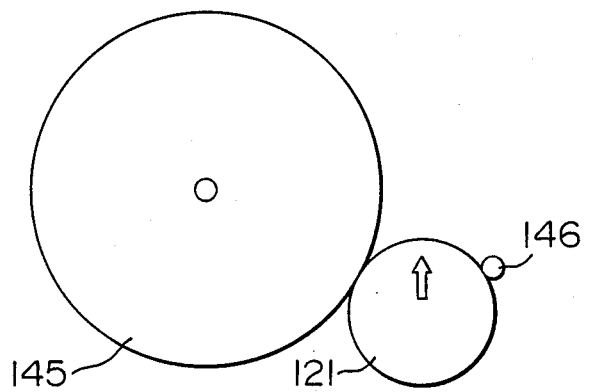
F I G. 34
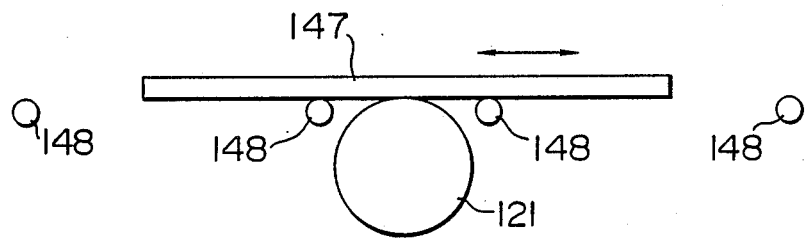

PIEZOELECTRIC REVOLVING RESONATOR AND ULTRASONIC MOTOR

CROSS-REFERENCE TO RELATED APPLICATIONS

This application is a continuation in part of application Ser. No. 145,987, entitled PIEZOELECTRIC ROTARY RESONATOR AND ULTRASONIC MOTOR filed on Jan. 20, 1988 in the name of Akio KUMADA.

BACKGROUND OF THE INVENTION

The present invention relates to a piezoelectric transducer, or more in particular to an improvement in a piezoelectric resonator used for the stator of an ultrasonic motor and further to an ultrasonic motor utilizing such a resonator.

Conventional ultrasonic motors are roughly divided into standing wave type and travelling wave type, both of which use the rotational torque received by a rotor in pressure contact with the surface of a resonant stator in an elliptical vibrating motion. The stator is made up of a piezoelectric elliptical resonator and is subjected to vibration instead of rotation, with the rotor incessantly continuing to rotate in a direction. In spite of the fact that the stator remains stationary with the rotor rotating, the torque can be transmitted between them by utilizing the static friction among their slipless motion because the vertical component of the elliptical vibration of the stator exerts buoyancy on the rotor and the stator is kept in contact with the rotor only during a half cycle of the vibration and thereby the torsional component of the vibration exerts a uni-directional rotational torque, on the rotor while the stator comes away from the rotor to return in the reverse direction during the remaining half cycle. When this principle is satisfied, the abrasion can be avoided.

Satisfaction of this principle, however, requires a very complicated mechanism for the travelling wave type, and both production and operation thereof is required to be based on a highly sophisticated technology. The basic reason for this lies in the disadvantage that the piezoelectric elliptical resonator does not rotate in real terms. Another disadvantage is that a piezoelectric elliptical resonator of standing wave type cannot be constructed in thin form and therefore the motor becomes thick, thereby making it impossible to reduce the thickness of the motor.

Further, the torque and output of an ultrasonic motor depends on the momentum associated with the vibration of the stator. In the conventional ultrasonic motors, only a fraction of the total mass is involved in the effective motion of the stator. This is by reason of the fact that the vibration generated in the stator has an amplitude distribution which is generally about $1/\pi$ or $\frac{1}{4}$ the total mass. In this way, the motion associated with the stator vibration cannot be utilized in full, resulting in torque and output drop to $1/\pi$ or $\frac{1}{4}$.

SUMMARY OF THE INVENTION

An object of the present invention is to create and provide a piezoelectric resonator suitable for the stator of an ultrasonic motor by obviating the short-coming of the conventional piezoelectric resonators that cannot be rotated.

Another object of the present invention is to solve the disadvantage of the conventional ultrasonic motor that only the rotor pressed against the unrotatable stator rotated and that the piezoelectric elliptical resonator making up the stator of the motor of standing wave type is a thick in construction and cannot be thinned, thereby providing a thinnable ultrasonic motor comprising a stator as what is called a resonator of gravity center revolution type ((the gravity center revolutes around its body center)) which effects a revolutional motion, like a hula hoop motion and thereby this revolutionally resonant stator can rotate the object being in contact with it to realize an operation stability, a long service life and an operating case with superior characteristics.

Conventional ultrasonic motors have the advantage that the size thereof can be decreased with the increase in frequency, but the disadvantage thereof is that the receiving area is reduced with the decrease in size, thereby making it impossible to produce a high-power miniature motor.

In view of this, a further object of the present invention is to provide an ultrasonic motor with a stator constructed substantially only of a piezoelectric material which has a high volumetric ratio of the stator, whereby the transducer may occupy a wide area of the transducer even for high frequencies of 30 KHz or more to make up a high-power transducer used for turning a shaft mounted through the motor or turning a hollow shaft.

According to the present invention, there is provided a piezoelectric revolving resonator the gravity center which revolves around its body center fixed to the ground thus realizing a motion similar to a physical body playing a hula hoop with a revolutional speed of several million r.p.m.

Assume a plurality of diameters dividing a circle into equal portions and a couple of radii constituting each diameter. If one radius of a diameter is extended and the other radius of it contracted by the same amount, the circumference and the center of the diameter with a parallel motion moves along the diameter Here, the shape of the circumference is to be held not to be deformed from the original true circle, the one half of a diameter mating radius would be required to contract or extend and the other half would be required to extend or contract, by the same amount along the first diameter Further, assume that a change happens on an adjacent diameter with the same amount of the extension and the contraction to the first diameter, and that the other diameters are also changed in a manner not to deform the circumference. The center of the new circle would move to the center of the second diameter. In this way, each time each adjacent diameter extends or contracts sequentially, the center of the circle moves along a small circle with a radius equivalent to the length of extension of the first radius. Specifically, with the resultant rotation of the center of the circle, the circle revolves around the original center thereof.

If a disc is excited with a natural frequency thereof, a resonance appears, thereby producing a vibration of a large amplitude. In the process, the disc is deformed by being uniformly extended or contracted within the plane in a manner of so called "the breathing mode". This condition is called the basic resonance or zero-order resonance. With a change in exciting frequency, the amplitude sharply falls. The resonance, however, is obtained sequentially, even with a frequency twice, thrice, or a larger multiple of the basic frequency, which are respectively called the 1st-order, 2nd-order and multiple-order resonances. Under the 1st-order resonance, the center of a circle vibrates along a diameter thereof while the shape of the circle remains substantially. As a result, the center (or the center of gravity) of the circle vibrates linearly.

In these resonance sequences, odd-order resonances as 1st-, 3rd-, and so on are hard to occur in case of piezoelectric resonaters, because of the difficulties of resonater holding with center of gravity is vibrating strongly Particularly, in ordinary piezoelectric resonaters, it is well known fact for the piezoelectric engineers that to excite even-order resonances is quite easy, but to excite odd-order resonances is impossible to practice. Considering this fact, this invention is proposed to realize piezoelectric first-order resonaters with the aid of the principle of "revolving resonance" which is seen in a hula-hoop motion.

A piezoelectric rotary transducer is required to comprise a piezoelectric device in the form of disc, ring or cylinder radially divided into an even number of equal regions which can be independently excited. It is also necessary that regions arranged symmetrically with respect to the center of the device are vibrated in opposite phases, and regions adjacently arranged are vibrated in different phases from each other.

Assume that a piezoelectric device has an electrode on the whole back surface thereof and four radially divided equal electrodes 1, 2, 3, 4, on the front thereof. It is also assumed that independently deformed regions are the same as the equally-divided four electrodes so that the regions are numbered the same way as the electrodes. The device is polarized along the thickness thereof and two adjacent regions 1 and 2 are polarized positive, while the other two adjacent regions such as 3 and 4 negatively. Thus each half of the device regions is polarized oppositely to each other.

According to another aspect of the present invention, there is provided an ultrasonic motor comprising a stator as a piezoelectric resonator of gravity center revolution type with the center of gravity making revolutions in a manner of hula hoop or harmonic drive. An ultrasonic motor is available in various types including vibrating reed type, travelling wave type and standing wave type. All of these types of motors are of a form transforming vibrations into rotational motion, therefore the center of the gravity of the stator remains immovably.

In this transducer resonator of gravity revolution type according to the present invention, in contrast, the center of gravity thereof is subjected to an eccentric rotation, that is, revolves around the fixed body center. An ultrasonic motor according to the invention is thus based on the operating principle that the rotational torque exerted by contacting a rotor to a resonant stator of gravity revolution type, acts to rotor the rotar through a static friction force occured between their contact surfaces.

The ultrasonic motor according to the present invention is an ideal type of motor with a very large output taking advantage of the movement of the center of gravity in which the total mass of the stator is utilized for producing the torque and output of the motor.

The principle based on a hula hoop for converting the ultrasonic vibration into rotational motion is not limited to the present invention but is also introduced in the Dec. 1, 1986 issue of the *Nikkei Mechanical*, p. 96. The case cited in the magazine though derived from the hula hoop, involves a motor of travelling wave type, whereas the present inventor has developed a resonator of gravity center revolution type (in which the center of gravity rotates around another object) and an ultrasonic motor using the same. It is interesting to note that the ultrasonic motors developed in these two cases are quite different from each other. The difference between them is evident in that a motor of travelling wave type has an unmovable center of gravity, while the motor according to the present invention has a revolving center of gravity. It was described above that both the torque and output are increased by utilizing the relocation of the center of gravity.

According to a further aspect of the invention, there is provided a piezoelectric transducer formed in a long cylinder polarized in such a manner that two semicylindrical regions divided along the diameter thereof have opposite polarities, and electrodes are arranged substantially over one of the entire outer and inner peripheral surfaces of the cylinder with two-equally divided electrodes arranged on the positive and negative areas of the other of the surfaces. In this construction, once a frequency is determined, the diameter is also determined. Since the length of the cylinder is not limited, however, the input impedance is reduced with the length thereby to realize a high-power piezoelectric rotary transducer driven at low voltage, and further a motor with this transducer as a stator. With the increase in axial length of the cylindrical transducer, the electrode area is increased, thereby decreasing the input impedance while increasing the resonance energy. This high energy can be converted into the turning effort of the rotor by transmitting the turning effort through a friction force with the rotor circumscribed or inscribed with the outer or inner peripheries of the cylindrical transducer. In the case where the rotor is pressed against the earth electrode surface, it may be brought into direct contact with the surface of the electrodes on the periphery of the transducer, or through a wear-resistant film. For other than the earth surface, it is necessary to provide an insulating film on the electrode in contact. A four-pole transducer has conveniently an earth electrode over the entire surface of one side of a cylinder. If the rotor is made of a hollow cylinder, a body tube or the like can be rotated with strong torque.

BRIEF DESCRIPTION OF THE DRAWINGS

FIGS. 7A, 7B and 7C are diagrams for explaining a modification of the present invention, in which FIG. 7A shows the primary resonance mode of a disk, FIG. 7B a gravity center revolving rotation mode of the present invention, and FIG. 7C a breathing mode of zero-order resonance of a disc.

FIGS. 15 and 16 are a plan view and a longitudinal sectional view respectively of an ultrasonic motor using the revolving resonater of FIGS. 13 and 14.

FIG. 29 is a partly-cutaway side view schematically showing a turntable drive unit.

FIG. 30 is an enlarged sectional view of a connector of the drive unit.

FIG. 31 is a side view schematically showing a disc drive unit.

FIG. 32 is a partly-cutaway side view schematically showing an annular drive unit.

FIG. 33 is a diagram schematically showing a configuration for explaining a drive unit for simultaneous actuation of a large-diameter rotary member and a small-diameter rotary member.

FIG. 34 is a schematic diagram showing a configuration for explaining a linear drive unit for a movable member.

DESCRIPTION OF THE PREFERRED EMBODIMENTS

The operating principle of a piezoelectric revolving resonator according to the present invention will be described below specifically with reference to embodiments.

(Embodiment 1)

Figure 1:
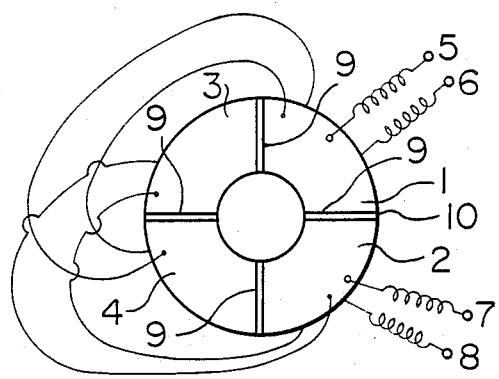
FIG. 1 and FIG. 2 are a plan view and a side view respectively of a piezoelectric revolving resonator according to an embodiment of the present invention.
Figure 2:
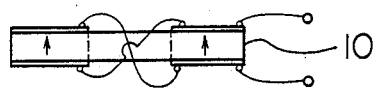
Figure 3A:
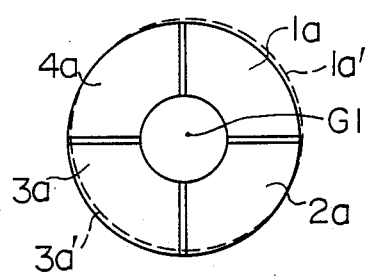
FIGS. 3A, 3B, 3C and 3D are diagrams for explaining the principle of a piezoelectric revolving resonator according to the present invention.
Figure 3B:
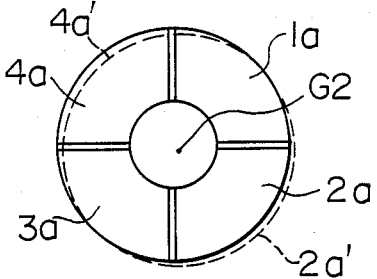
Figure 3C:
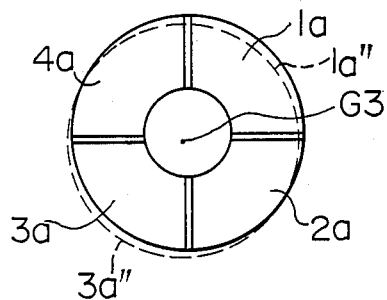
Figure 3D:
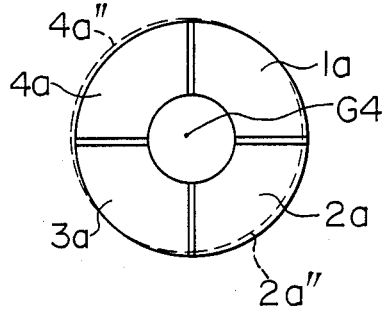

FIG. 1 is a schematic plan view showing a piezoelectric revolving resonator according to an embodiment of the present invention, and FIG. 2 is a schematic side view thereof. An annular disc 40 mm in outer diameter, 15 mm in inner diameter and 2 mm thick of a Pb(Zr-Ti)$O_3$ piezoelectric ceramics has upper and lower main surfaces thereof coated with an equally-divided silver-baked electrode.

According to the embodiment under consideration, the surfaces are divided into four equal parts with an insulating slit 0.5 mm wide 9 formed between each adjacent electrodes. Upper electrodes 1, 2, 3 and 4 are connected in common, and so are four back electrodes corresponding to the front electrodes. Poling process has been done by the application of a high DC voltage to the disk between the four front electrodes and the corresponding four back electrodes, thus the whole disk was poled substantially uniformly in the same direction.

The front of the electrode 1 is connected to the back of the electrode 4, the back of the electrode 1 to the front of the electrode 4, the front of the electrode 2 to the back of the electrode 3, and the back of the electrode 2 to the front of the electrode 3. These four groups are connected with lead wires 5, 6, 7 and 8 respectively. An AC voltage of 100 volts, 40 KHz is applied between the lead wires 5 and 6, and the same voltage of the same frequency but 90° retarded in phase is applied between the lead wires 7 and 8. With a slight change in the frequency of the applied voltage, a strong resonant vibration was caused at 38.8 KHz.

A deformation of the device with this vibration is illustrated in FIG. 3. FIGS. 3A to 3D indicate a change of the device during one cycle of a sinusoidal wave voltage. Specifically, FIG. 3A shows deformations 1'a and 3'a of the device that are caused the instant a voltage of +100 V and −100 V are applied to the regions 1a and 3a and 0 volt to the regions 2a and 4a respectively. FIG. 3B shows deformations 2'a and 4'a of the device that are caused the instant voltages of +100 V and 100 V are applied to regions 2a and 4a respectively and 0 volt to the regions 1a and 3a respectively. Similarly, FIGS. 3C and 3D show deformation 1"a, 3"a, 2"a and 4"a respectively after one half and $\mu$ cycle from predetermined time points With the progress from FIG. 3A to FIG. 3D, the convex part of the arc makes a revolution along the circumference counterclockwise, with the result that the centers of gravity G1, G2, G3 and G4 of the device makes a circular motion clockwise.

Apart from the above-mentioned device equally divided into four parts, the device may of course be alternatively divided into six, eight, ten parts and so on. With the increase in the number of parts into which the device is divided, however, the phase relations are complicated with multiple phase of the driving voltage involved. Therefore, excepting for the device larger than about 10 cm in diameter, division into four to six parts is considered to meet practical purposes most suitably.

(Embodiment 2)

Figure 4:
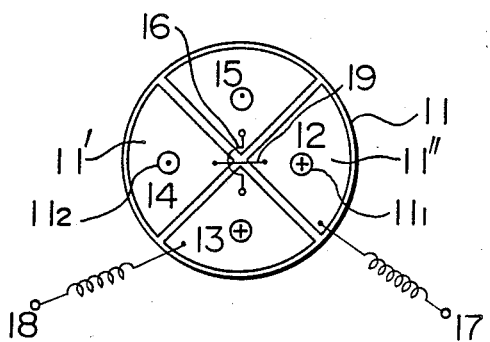
FIGS. 4 and 5 are a plan view and a sectional view respectively of a four-pole revolving resonator according to an embodiment of the present invention.
Figure 5:
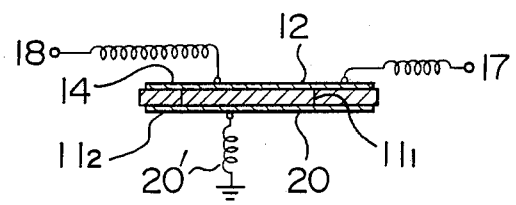

FIGS. 4 and 5 show a four-electrode revolving piezoelectric resonator according to an embodiment of the present invention. A piezoelectric ceramic disc 11 made up a Pb(ZrTi)O$_3$ material 40 mm in diameter and 2 mm thick is polarized in each semicircular part thereof in reverse directions 11$_1$ and 11$_2$. The disc 11 has a back side thereof carrying a full-surface electrode 20, and a front side thereof having positively-polarized region and a negatively-polarized region carrying respectively equally halved arcuate electrodes 12, 13, 14 and 15, connected respectively with lead wires 16, 17, 18, 19. Further, the back electrode 20 is grounded through a lead wire 20'.

Figure 7A:
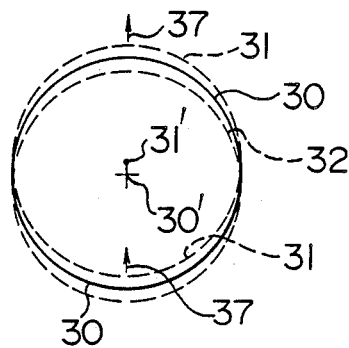

Assume that a voltage of +100 V is applied to the lead wires 16 and 18 in common, and the lead wires 17 and 19 grounded also in common As shown in FIG. 7A, the disc 30 is subjected to a deformation as shown by dotted line 31 as if the disc has been displaced as designated by an arrow 37, so that the center of gravity also moves from 30' to 31'. When the voltage of the lead wires 16 and 18 is changed to −100 V, a deformation as designated by a dotted line 32 occurs, so that an application of an alternating voltage causes vertical vibrations of the disc 30 between the dotted lines 31 and 32 in FIG. 7A. On the other hand, the zero-order resonance obtained when an alternating voltage is applied to a piezoelectric resonator with the disc 30 polarized along the thickness uniformly in the same direction and with two electrodes covered on each whole surface takes a breathing mode shown in FIG. 7C, and the disc 30 vibrates between the dotted lines 35 and 36. The next resonance that appears with the increase in frequency takes a mode indicated by a dotted line in FIG. 7A.

Figure 7B:
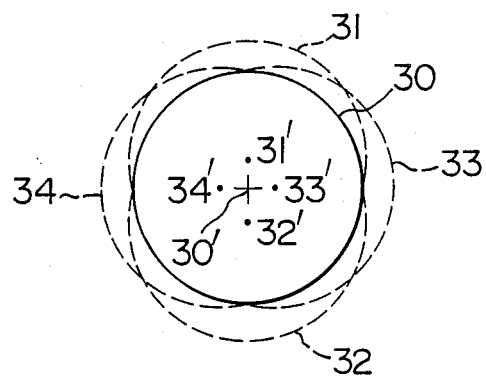
Figure 7C:
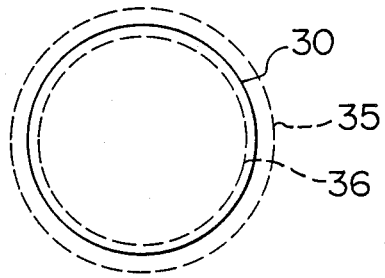

Therefore, the deformation obtained by the application of an alternating voltage to the electrodes 16 and 18 of the revolving piezoelectric resonator of FIG. 4 explained first above coincides with the 1st-order resonance mode of an ordinary disc resonator. Now, assume that the lead wire 17 is taken off the ground and is subjected to an alternating voltage with the same frequency as but different in phase by 90° from the voltage applied to the lead wire 16. Deformations 31, 33, 32, 34 as shown in FIG. 7B occur, and the point of center of gravity moves to 31', 33', 32', 34' respectively, thus making a rotation of the gravity center 30' in each cycle around the fixed point.

In this motion, the center of gravity of the revolving piezoelectric resonator disc 11 revolves around the center in synchronism with the exciting alternating frequency, but the resonator disk itself does not rotate. Therefore, we call this vibration mode as a revolving resonance; revolution of the disk.

(Embodiment 3)

Figure 6:
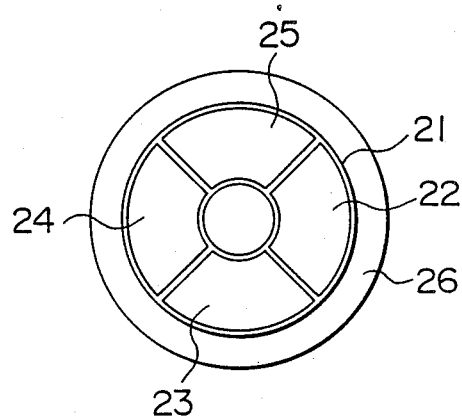
FIG. 6 is a plan view showing another embodiment.

FIG. 6 is a diagram showing a four-pole revolving piezoelectric resonator according to an embodiment of the present invention, which is made of the same material as the piezoelectric disc used in the embodiment 1 above. Specifically, an annular element 21 made of a disc having the same thickness and the same diameter formed with a hole 15 mm in inner diameter at the center thereof is covered with electrodes 22, 23, 24, 25 arranged in the same way as the piezoelectric disc 11 and connected to assume the same potential. This piezoelectric disc 21 is set in the inner periphery of an aluminum ring 26 50 mm in outer diameter and 40 mm in inner diameter, and is excited to resonate at the resonant frequency thereof.

The ring deformation with resonance assumes a mode shown in FIG. 7B, and thus the ring center of gravity revolves from 31', 33', 32' and 34'. In this case, the vibration amplitude of the piezoelectric ceramics is amplified in resonance with the primary vibration mode of the aluminum ring, thereby leading to a Q value of vibration considerably larger than the embodiment 2 comprising only a ceramic piezoelectric member.

Now, embodiments of an ultrasonic motor according to the present invention will be explained.

(Embodiment 1)

Figure 8:
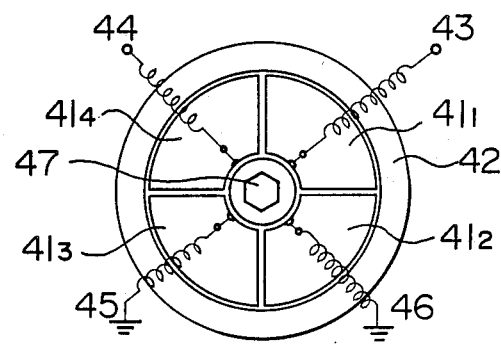
FIGS. 8 and 9 are a plan view and a longitudinal sectional view respectively of an ultrasonic motor of gravity center revolution type according to an embodiment of the present invention.
Figure 9:
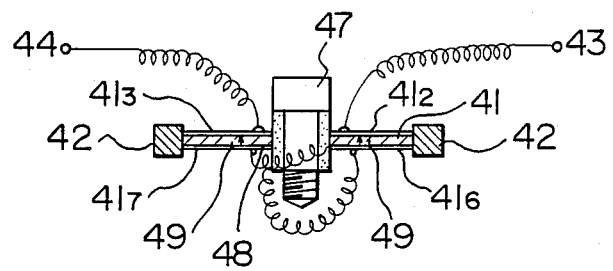

FIGS. 8 and 9 are diagrams showing a most simple embodiment of an ultrasonic motor of gravity center rotation type according to the present invention. A piezoelectric ceramic disc 41 of Pb(ZrTi)O$_3$ 40 mm in diameter, 15 mm in inner diameter and 2 mm in thickness is polarized along the thickness 49, and the front and back sides thereof are divided into four equal electrodes 41$_1$, 41$_2$, 41$_3$, 41$_4$ and electrodes 41$_5$, 41$_6$, 41$_7$, 41$_8$ (not shown) on the back. After the electrode 41$_1$ is shorted with 41$_7$, the electrode 41$_2$ with 41$_8$, electrode 41$_3$ with 41$_5$, and electrode 41$_4$ with 41$_6$, a sinusoidal wave voltage of 100 V is applied between the electrodes 41$_1$ and 41$_3$. The same voltage with the same frequency but different in phase by 90° from the above-mentioned voltage is applied between the electrodes 41$_2$ and 41$_4$.

Figure 10:
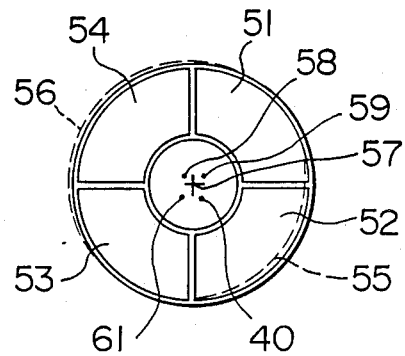
FIG. 10 is a diagram for explaining the revolution of gravity center with modification of the gravity center revolving resonator making up the stator of an ultrasonic motor of gravity center revolution type according to the present invention.

The piezoelectric disc 41 is supported with a urethane spring 48 15 mm in outer diameter, 6 mm in inner diameter and 10 mm long at the central hole 15 mm in inner diameter thereof. The urethane spring 48, in turn, has a cap bolt 47 6 mm in diameter passed through the center thereof and fastened to a support plate (not shown). As the bolt 47 is fastened, the outer diameter of the spring 48 is enlarged, thus making it possible to support the piezoelectric disc 41 firmly. With the change in the frequency of the voltage applied to the piezoelectric disc 41, a resonant condition occurs thereby to cause a strong vibration. This vibration occurs in such a manner that as shown in FIG. 10 as an instant figure, with the enlargement of the region 54, the region 52 contracts. At this instant the region 51 or 53 is not subjected to any expansion or contraction, and therefore, the outer periphery of the piezoelectric disc 41 is deformed in the manner shown by dotted lines 56 and 55. As a result, the center of gravity of the disc 41 is displaced from the point 57 to 58. In the next $\pi/2$ cycle, the outer periphery of the region 51 expands while the outer periphery of the region 53 contracts, so that the center of gravity shifts to the point 59, and during the cycle of $\pi$, it shifts to point 60, and during the period of $3/2\cdot\pi$, to point 61. After all, the center of gravity of the piezoelectric disc 41 revolves along the circumference off about several $\mu$m from the fixed center during one cycle of resonant frequency. Numeral 57 designates a plus mark indicating the fixed center.

The deformation due to the vibration coincides with the 1st-order resonance mode of the disc 41, and the deformation is occured by the excitation of two phase 46.5 KHz signals. Specifically, the center of gravity revolves around another object plotting a circle of several μm in radius at the rate of 46500 revolution per second. When an aluminum ring 50 mm in outer diameter, about 40 mm in inner diameter and 5 mm thick is circumscribed on the piezoelectric disc 41, the ring began to rotate vigorously in the counterclockwise direction. Since the ring is formed precisely as a double ring of 40,000±0.0025 mm in the upper 2 mm part of the inner diameter and 40,005±0.0025 mm in the lower 3 mm part thereof, the ring fitted with the piezoelectric disc 41 did not fall off. When the phase between driving two-phase 46.5 KHz signals is changed by −90° at the next moment, the rotor rotated reversely with the same speed and the same torque.

(Embodiment 2)

Figure 11:
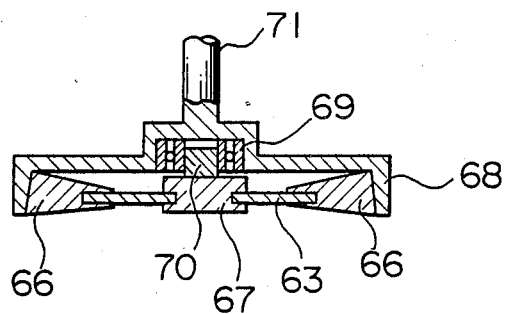
FIG. 11 and FIG. 12 are a longitudinal sectional view and a plane sectional view respectively of an ultrasonic motor of gravity center revolution type according to another embodiment of the present invention.
Figure 12:
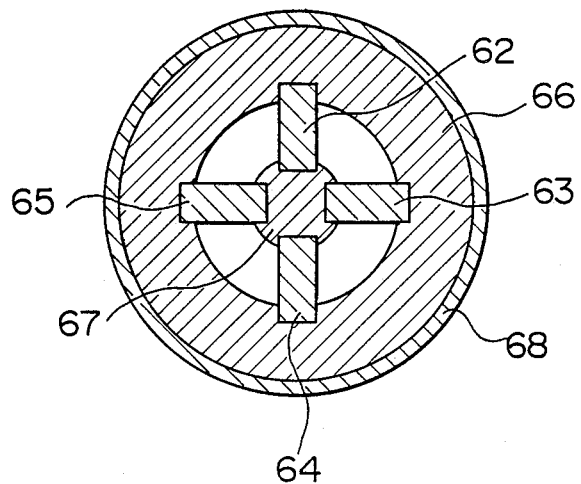

FIGS. 11 and 12 are diagrams for explaining an ultrasonic motor of gravity center revolving type according to another embodiment of the present invention. The difference of this embodiment from Embodiment 1 lies in that in this embodiment, the disc piezoelectric device is replaced with rectangular plates 62, 63, 64, 65 5 mm by 2 mm in dimensions, which are fitted in aluminum discs 67 and 66, and the piezoelectric device was driven in the same manner as in Embodiment 1.

The vibration of the piezoelectric member 63 and 65 is amplified in resonance with the 1st-order resonance mode of the aluminum disc 66, thereby making it possible to vigorously rotate the rotor 68 with the center thereof held by a bearing 69 at the rate of 400 rpm. A torque of 1 kg-cm is thus derived from the output shaft of the rotor 68.

The inner peripheral surfaces of the aluminum disc 66 and the rotor 68 assume a conical form with a taper of about 10° to facilitate pressure contact therebetween, and the rotor 68 is strongly pressed against the stator by a spring (not shown). The counter rotation is also of course possible in this case by switching the phase relationship between the applied voltages to the two piezoelectric devices opposed to each other. In FIG. 11, numeral 70 designates a support shaft.

(Embodiment 3)

Figure 13:
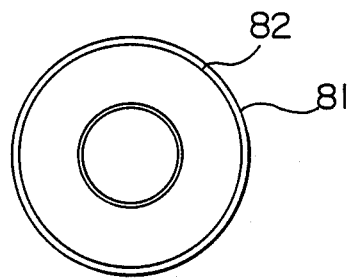
FIG. 13 and FIG. 14 are a plan view and a bottom view respectively showing a two pair type of a four-pole piezoelectric revolving resonator according to an embodiment of the present invention.
Figure 14:
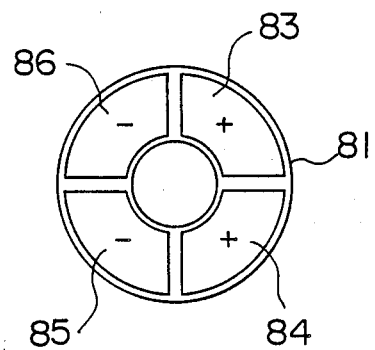

FIGS. 13 and 14 are a plan view and a bottom view respectively showing the polarization of a piezoelectric device of a two-pair four-pole revolving resonator and an arrangement of electrodes thereof according to the present invention. FIGS. 15 and 16 are a plan view and a longitudinal sectional view respectively of a motor using the resonator.

A hollow disc 81 made of a Pb(ZrTi)O₃ piezoelectric ceramics has one side thereof covered with an earth electrode 82, and the other side thereof carrying arcuate electrodes 83, 84, 85, 86 fanning out in circular quarters as shown in FIG. 14. Of these electrodes, the electrode 82 is grounded, the electrodes 83 and 84 impressed with a high positive DC voltage, and the electrodes 85 and 86 with a high DC negative voltage for 24 hours during this poling process finishing the poling process, plus (+) and minus (−) signs indicating the polarity of residual polarization are marked.

A couple of discs processed in the same way which have an outer diameter of 40 mm, an inner diameter of 15 mm and a thickness of 2 mm, for instance, are overlaid one on the other with the plus electrodes and minus electrodes being accurately face to face, respectively, and arcuate terminal sheets 101, 102, 103, 104 as shown in FIG. 15 are inserted inbetween. The resulting assembly is set in an aluminum ring 97 integrally.

The electrode 101 is shorted with the electrode 103, and the electrode 102 with the electrode 104, and are connected with lead wires 90 and 89 respectively. Further, as shown in FIG. 16, an outer shorting electrode 92′ and a shorting electrode 92′ are shorted and are connected to the ground with a lead wire 88. The lead wire 89 and the lead wire 90 are impressed with a sinusoidal wave voltage of about 125 KHz with the frequency thereof coinciding with a resonance frequency, resulting in a piezoelectric gravity center revolving resonator.

The outer periphery of the aluminum ring 97 of the piezoelectric revolving resonator configured this way is tapered at 75°, and a disc 98 having the same inner diameter and a taper coinciding with the taper of the aluminum ring 97 is placed thereon, with the result that the disc 98 rotates smoothly In this case, brass is used as a material of the disc 98. If other metal, glass, ceramics or other similar hard material is used, however, the disc 98 rotates as smoothly acting like a rotor. The rotational speed, which is proportional to the voltage, exceeds 200 rpm at about 50 volts When the phase relationship of a two-phase power supply is reversed by advancing the electrodes 102, 104 ahead of the electrodes 101, 103, for example, the disc 98 rotates clockwise, while when the slow electrodes 101, 103 are retarded in phase from the fast electrodes 102, 104, on the other hand, the disc 98 rotates counterclockwise As described above, the ring 97 is closely fit on the outer periphery of the revolving resonator 91 integrally thereby to increase the mechanical strength of the revolving resonator 91 considerably Also, by overlaying a couple of revolving resonators 91 one on the other, not only the output is doubled but also the mechanical strength improved, thereby producing an ultrasonic motor superior in shock resistance.

Now, a modification of the ultrasonic motor according to the present invention will be explained.

Figure 17:
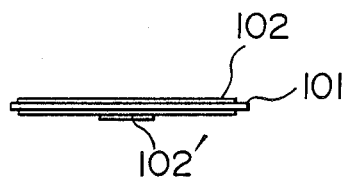
FIG. 17 and FIG. 18 are a side view and a plan view respectively of an ultrasonic motor according to an embodiment of the present invention.
Figure 18:
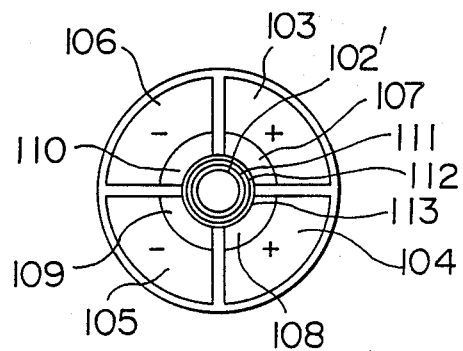

An embodiment of ultrasonic motor free of a rotary mechanism according to the present invention is shown in FIGS. 17 and 18.

A disc made of Pb(ZrTi)O₃ piezoelectric ceramics 40 mm in outer diameter, 15 mm in inner diameter and 0.5 mm thick is polarized along the thickness thereof in such a manner that alternate semicircles thereof are opposite in polarity. One side of this disc is covered with an earth electrode 102 over substantially the whole surface thereof (See FIGS. 13 and 14), and the other side thereof with four squarely fanning-out quarter circle in the positive and negative regions thereof The positive electrodes 103, 104 are marked with a plus (+) sign, and the negative electrodes 105, 106 with a minus (−) sign, thereby making up a piezoelectric revolving resonator 101. A stainless steel plate 38 mm in outer diameter and 0.2 mm thick having the same size as the earth electrode 102 is formed with a hole at the center thereof, and the central hole of the disc 101 is fitted with a fitting 102′ fixed with a stainless steel pipe 118′ having an outer diameter of 8 mm and a height of 1 mm (not shown). This assembly is fitted further with an insulating ring 111, around which a pair terminal plate 107–109 with -shaped section are laid, covered and set with an insulating ring 112, arranged with another pair terminal plate 108–110, and covered and set with an insulating ring 113 thereby to complete an ultrasonic motor free of a rotary mechanism according to the present invention.

The pair terminal plate 107–109 and the another pair terminal plate 108–110 are connected with a lead wire respectively, and a two-phase sinusoidal wave voltage of 45 KHz is applied between each pair electrode and the earth electrode 102. The frequency is adjusted to excite a resonant condition of gravity center revolving resonance, thus completing an ultrasonic motor free of a rotary mechanism.

Figure 19:
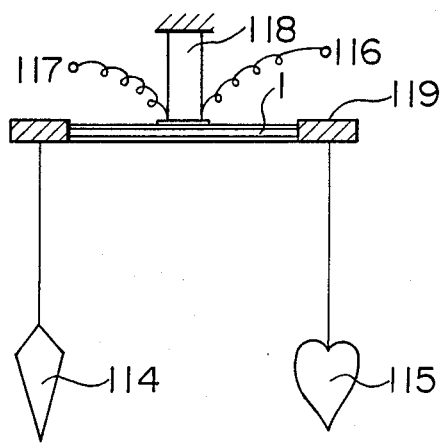
FIG. 19 is a side view of a display used with the motor of FIGS. 17 and 18.

This motor has no rotary mechanism, and therefore it is not known from the appearance whether it is in operation or not. Whether it is in operation or not becomes apparent, however, when an object to be rotated is set thereon. If this motor is in normal operation, the object, set or contacted outerward of the stator, would rotate under direct rotational torque. Specifically, the ultrasonic motor free of a rotary mechanism according to the present invention is a direct drive (D.D) motor not only a gearless one, but in the true sense of the words. An application of this motor is shown in FIG. 19 and drawings of subsequent numbers. A support bolt 118 is passed through a hole 6 mm in diameter formed at the center of a motor shown in FIGS. 17 and 18 to hang the motor from the ceiling, and the outer peripheral part is fitted with a ring 60 mm in outer diameter and having an inner diameter 0.05 mm larger. The inner diameter of the ring 119 has an eaves 0.5 mm wide to prevent fall of the ring 119. As beautifully-shaped reflectors 114 and 115 are suspended from the ring 119, the ring 119 vigorously rotates when the lead wires 116, 117 are connected to a two-phase power supply. This ring functions as a display which catches eyes of people by changing the speed or reversing the direction of rotation.

Figure 20:
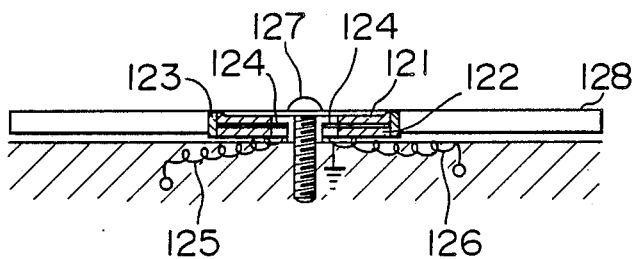
FIG. 20 is a side view with the essential parts cut away showing the manner in which the motor of FIGS. 17 and 18 is used to rotate a disc.

FIG. 20 shows an ultrasonic motor free of rotary mechanism according to the present invention applied to a disk rotation. Two piezoelectric revolving resonator 121, 122 shown in FIG. 20 are fitted in an aluminum ring 123 having an outer diameter of 41.95 mm, an inner diameter of 40 mm and a height of 1.5 mm with a flange 43 mm in outer diameter and 0.3 mm thick along the outer periphery thereof by a method of fabrication of a two-pair four-pole piezoelectric revolving resonator separately suggested, thus making up a motor without a rotary mechanism. This motor is set on a support with a bolt 127 passed through a central hole thereof. An optical disc 128 having an outer diameter of 12.7 mm, an inner diameter of 42 mm and a thickness of 1 mm is set on this assembly, and leadwires 125, 126 are connected to a two-phase power supply. When a voltage of 80 volts is applied, the disc 128 rotates at the speed of 600 rpm.

Figure 21:
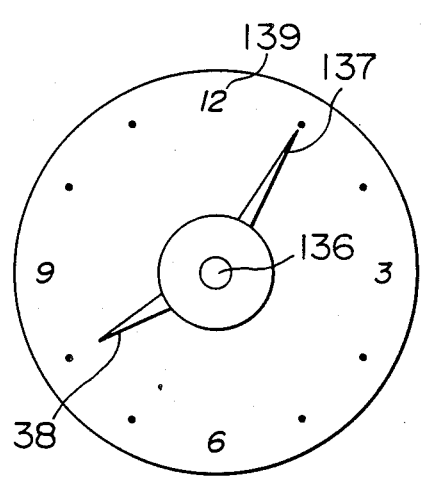
FIG. 21 and FIG. 22 are a front view and a sectional view of a clock using the same motor.
Figure 22:
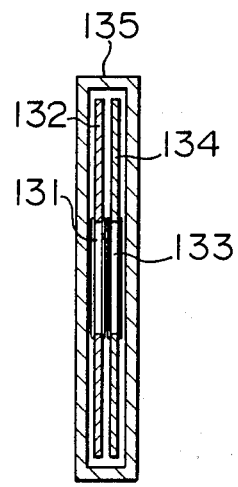

FIGS. 21 and 22 show a case of application of the motor to a clock. This clock 150 mm in diameter and 5 mm thick has a thickness about half a wrist watch. A case 135 having a thickness 1 mm is made of a hard glass and holds therein two motors 131, 133 according to the present invention set with a support bolt 136 to permit independent operation. The back of the front cover of the case 135 is printed with letters 139. A motor 131 is set in a glass disc 120 mm in diameter, 40 mm in inner diameter and 0.5 mm thick printed only with a minute hand 137, while the motor 133 is set in a glass disc 134 of the same size printed with an hour hand 138. These two motors 131, 133 were operated by independent intermittent signals respectively and were thus confirmed to function as a clock accurately.

Figure 23:
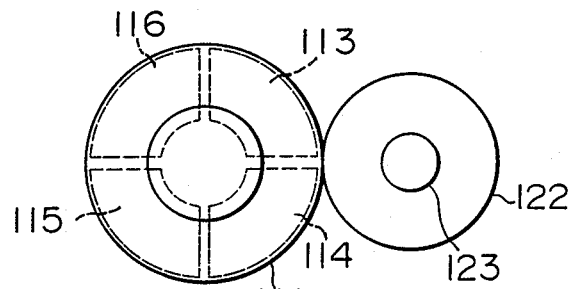
FIG. 23 and FIG. 24 are a plan view and a partly-cutaway side view respectively of an ultrasonic motor of rotating roller type according to an embodiment of the present invention.
Figure 24:
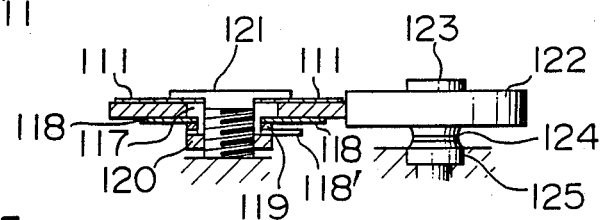
Figure 25:
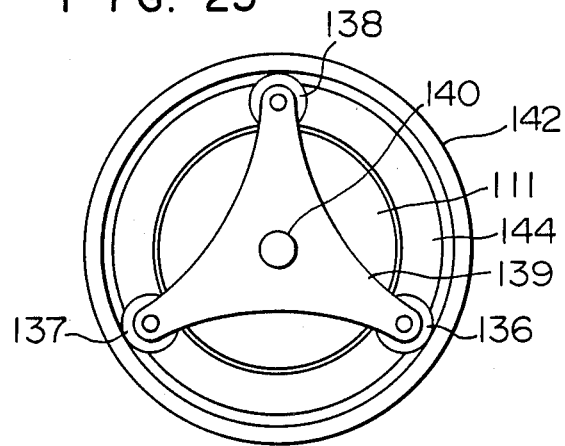
FIG. 25 and FIG. 26 are a plan view and a sectional view respectively of an ultrasonic motor of rotating roller according to another embodiment of the present invention.
Figure 26:
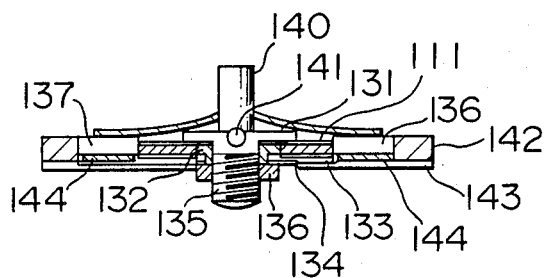

FIGS. 23 and 24 are diagrams for explaining the principle of operation of an ultrasonic motor of rotating roller type according to an embodiment of the present invention, and FIGS. 25 and 26 diagrams for explaining the principle of operation of another embodiment of the present invention.

A piezoelectric ceramic disc of $Pb(ZrTi)O_3$ 40 mm in diameter, 15 mm in inner diameter and 2 mm thick is polarized along the thickness thereof in such a manner that semicircles thereof have opposite polarities. One side of this disc is covered with an electrode over the entire surface thereof, and the other side thereof with quarter-circle arcuate electrodes in positive and negative regions thereof thereby to make up a piezoelectric revolving resonator 111. An insulating bushing 117 is set in the revolving resonator 111, which is then fitted with a terminal plate 118, an insulating washer 119, a terminal plate 118' (See FIG. 24). A cap bolt 121 is passed through the center of this assembly, which is fixedly fastened with a nut 120, and by fastening a bolt 121 in a threaded hole of the support, a revolving stator is constructed.

In the next process, a bolt 123 is passed through a roller 122 integrated with a pulley 124, and the resulting assembly is fixedly screwed through a bearing pressure-fitted fixedly in a support plate in such a way that the roller 122 is in firm pressure contact with the stator.

The terminal plate 118 and the terminal plate 118' are impressed with a sinusoidal wave voltage of 45 KHz, and the terminal plates 118 and 118' with a voltage displaced in phase by $\pi/2$ branching from the same power supply thereby to impose an electric field on the resonator 111. As a result, when the voltage increases beyond about 20 volts, the roller 122 begins to rotate, and when the voltage reaches about 50 volts, it vigorously rotates, thereby realizing an ultrasonic motor which produces a strong rotational torque through a belt (not shown) set in the pulley 129.

The aforementioned embodiment indicates that a roller firmly pressured against the outer periphery of a resonator for the purpose of producing a strong rotational torque from an ultrasonic motor of revolving resonator type is convenient means. The difference of this embodiment from the case in which an umbrella-shaped motor is pressured is that in the embodiment under consideration, the fact that the roller is not pressed against the whole surface of the outer periphery of the resonator appears to prevent the deformation of the resonator from being dampened. A method has thus been tested in which the output torque is further increased by increasing the pressing force sufficiently. FIGS. 25 and 26 are diagrams for explaining such an embodiment. In this embodiment, three bearings 136, 137, 138 having 6 mm in diameter and 3 mm thick are circumscribed against the outer periphery of a revolving resonator 111 used in the aforementioned embodiment, and the axes of these bearings are set in regular triangle 120° apart on a support plate 139. A steel ring 142 having an inner diameter of 52 mm, an outer diameter of 55 mm and a height of 4 mm is shrinkage fitted from the outer side of this assembly The free sides of the bearings 136, 137, 138 are set in a hole of a thin ring 144 of steel 51 mm in outer diameter, 41 mm in inner diameter and 0.5 mm thick, and the outside of this assembly is fastened with an outer ring 142 to cover the case plate 143 and prevent the rotation thereof An output shaft 140 having a diameter of 6 mm is fixed at the center of the support plate 139, and the bottom of the shaft 140 is supported by a bolt 131 through a steel ball 141. As a result, even when the shaft 140 is under a load, it does not wobble, thus producing a stable strong torque of about 1 kg-cm.

Numeral 132 in the drawing designates an insulating bus, numerals 133, 134 terminal plates, numeral 135 a bolt, and numeral 136 a nut.

Now, further embodiments of the present invention will be explained with reference to the accompanying drawings.

Figure 27:
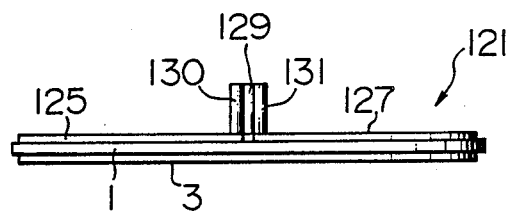
FIG. 27 and FIG. 28 are a side view and a plan view respectively of a four-pole piezoelectric revolving resonator.
Figure 28:
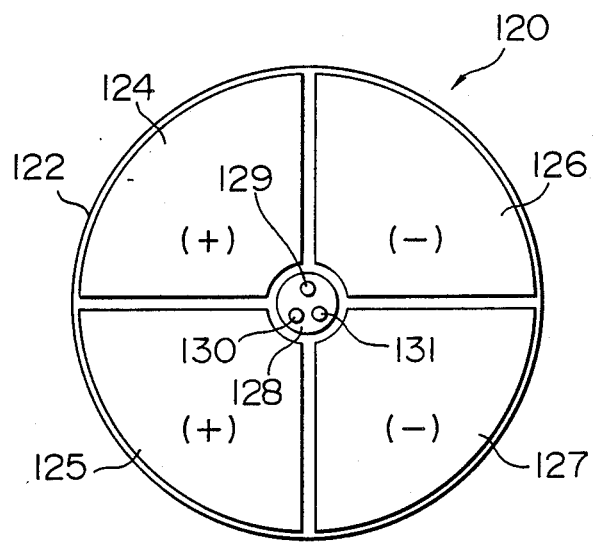

FIGS. 27 and 28 are a side view and a plan view respectively of a four-pole piezoelectric revolving resonator used in applications described below. First, the configuration of this four-pole piezoelectric revolving resonator will be explained.

Numeral 121 in the drawing designates a four-pole piezoelectric rotary transducer configured in the manner as described below. A disc 122 made of a Pb(ZrTi)$O_3$ ceramics 40 mm in outer diameter, 15 mm in inner diameter and 0.5 mm thick is polarized along the thickness thereof in such a manner that semicircles thereof have opposite polarities to each other. Substantially the whole surface of one side of the disc 122 is covered with an earth electrode 82 (See FIGS. 13 and 14), and the other side thereof with squarely fanning-out quarter-circle arcuate electrodes 124, 125, 126, 127 in positive and negative regions thereof, thus forming a four-pole piezoelectric revolving resonator 121. The positive electrodes 124, 125 are marked with a plus (+) sign, and the negative electrodes 126, 127 with a minus (−) sign.

The revolving resonator 121 has the central part therefor formed with an electrical insulating member 128 of synthetic resin integrally therewith, from which insulating member are projected a positive terminal 130 and a negative terminal 131 independently. These terminals 129, 130, 131 assume a form of pin made of such a slightly elastic metal as brass. Though not shown, the earth terminal 129 is electrically connected to the earth electrode 122, the one terminal 130 to the electrodes 124, 127 and the another terminal 131 to the electrodes 126, 125.

FIGS. 29 and 30 show a case in which a turntable 132 of a record player is rotated by use of at least one or two of the revolving resonator 121. The turntable 132 has a central part thereof formed integrally with a rotational axis 133 and supported rotatably by a bearing 134.

As shown in FIG. 29, the four-pole piezoelectric revolving resonator 121 is arranged inside of a cylindrical member 135 on the outer periphery of the turntable 132. A connector 136 is arranged under the turntable 132, and by pressure-fitting the terminals 129, 130, 131 of the revolving resonator 121 into a pin support 137 of the connector 136, the outer periphery of the rotary transducer 121 is brought into presser contact with the interior surface of the cylindrical member 135 by utilizing the elasticity of the terminals 129, 130, 131 and the pin supports 137. In other words, the diameters of the turntable 132 and the revolving resonator 121 and the relative position of the turntable 132 and the connector 136 are determined in such a manner that the rotary transducer 121 is in pressure contact with the turntable 132 by utilizing the elasticity of the terminals 129, 130, 131 and the pin supports 137.

When a two-phase sinusoidal wave voltage of 45 KHz is applied between the one terminal 130, the another terminal 131 and the earth terminal 129, the rotary transducer 121 is excited into a resonant state of gravity center revolving resonance, whereby a rotational drive torque is directly generated in the turntable 132. In the case of a record player, the needle pressure is normally 0.5 to 3 g-cm requiring no strong rotational torque, and therefore this revolving resonator 121 has a sufficient capacity to rotate the turntable 132.

FIG. 31 is a diagram showing an application in which a disc 138 such as for rotating a specimen in a low-temperature device or a high-temperature device or a wafer-rotating disc in a vacuum evaporator is driven.

The revolving resonator 121 thus configured is supported at a position slightly floated from a base member 140 by a sucker 139, and at the same time the revolving resonator 121 is pressed against the outer periphery of the disc 138 by utilizing the elasticity of the sucker 139. The frequency of the power supply for supplying the revolving transducer 121 is adjusted in such a manner as to excite the disc 122 into a resonant state of gravity center revolution mode, thereby generating a directly rotational torque in the disc 138 for causing the smooth rotation thereof. In this case, instead of pressing the motor against the turntable, a belt may of course be hung or a gear formed on the turntable to drive the same.

FIG. 32 is a diagram showing an example of rotating a tabular or annular member 142 having a through hole 141 at the central part thereof. In this case, the outer periphery of the revolving resonator 121 is pressure set in a ring 143 made of chromium coated aluminum, zirconium oxide or silicon nitride integrally with the revolving resonator 121. The whole outer periphery of this ring 143 is tapered. The while inner periphery of the annular member 142 is also formed with a taper coincidental with the taper of the ring 143. Numeral 144 designates a support cylinder for supporting the revolving resonator 121, and has a hollow part thereof through which the terminals 129, 130, 131 are fitted and connected to a power supply not shown.

As a result of the annular member 142 being fitted to the tapered ring 143, the annular member 142 is supported by the ring 143 on the tappered side thereof, so that the tare weight of the annular member 142 causes itself to be in pressure contact with the revolving resonator 121 through the ring 143. In this embodiment a tapered disk revolving resonater is available instead of the use of the tapered ring, and also, the revolving resonator 121 is impressed with a two-phase sinusoidal wave voltage of a predetermined frequency thereby to smoothly rotate the annular member 142. This motor is useful for such applications as driving an optical disc, a floppy disc, a hard disc or a record disc.

Especially in a configuration as that of this embodiment where the revolving resonator 121 is fitted in the central through hole 141 of the annular member 142, a disc built in with a motor is made possible and the thickness of a drive unit such as a portable or pocketable CD is further reduced.

FIG. 33 shows an application in which a large-diameter rotary member 145 and a small-diameter rotary member 146 are driven at the same time by single revolving resonator 121. As shown in FIG. 33, the large-diameter rotary member 145 and a small-diameter rotary member 146 are arranged in proximity to each other with the revolving resonator 121 inbetween. The revolving resonator 121 is pushed along in the direction of a arrow by utilizing the snap-in to a connector or the elasticity of a sucker as mentioned above, with the result that the rotary transducer 121 is kept in pressure contact with the outer peripheral parts of the large-diameter rotary member 145 and the small-diameter rotary member 146.

Upon application of a two-phase sinusoidal wave voltage of a predetermined frequency to the revolving resonator 121, a rotational torque is generated independently in the large-diameter rotary member 145 and the small-diameter rotary member 146, which are thus rotated smoothly. The large-diameter rotary member 145 is larger and the small-diameter rotary member 146 is small in diameter than the revolving resonater 121 respectively, so that the large-diameter rotary member 145 rotates at low speed and the small-diameter rotary member 146 at high speed. This system in which the rotary members rotate at different speeds with a constant ratio is applicable to, for instance, a decorated display unit.

FIG. 34 shows an example in which a mobile member 147 such as a tabular member is linearly moved in the direction indicated by arrow. The mobile member 147 is mounted on the outer periphery of the revolving resonator 121, and by using the tare weight thereof, the mobile member 147 is kept in pressure contact with the revolving resonater 121.

When a two-phase sinusoidal wave voltage of a predetermined frequency is applied to the revolving resonator 121, a moving torque is directly generated in the mobile member 147 thereby to drive the mobile member 147 in linear direction. In FIG. 34, numeral 148 designates a guide member that may be freely rotated or not rotated.

As explained above, according to the present invention, a disc-shaped, annular or cylindrical piezoelectric device having an even number of radially equally divided, independent deformable regions is so configured that the regions arranged symmetrically with respect to the center thereof develop vibrations of opposite polarities to each other and the regions adjacently arranged develop vibrations of different phases from each other upon excitation by use of an electrical signal of ultrasonic band.

As a consequence, in a piezoelectric revolving resonater according to the present invention, the deformation due to vibrations is transmitted sequentially to adjacent regions, with the result that the center of gravity of the unrotatable piezoelectric device with the fixed center makes a revolution in clockwise or counterclockwise direction, at the extremely high speed thereby an effective eccentric rotation of the device with a fixed center causes to make rotation of another object contacted to the device as like as a hula-hoop motion. Therefore, a load in pressure contact with the outer periphery of the device rotates on its own axis, thus eliminating such parts of a rotary mechanism as a bearing holding a load or a gear for transmitting torque to a load which has thus been indispensable for an ordinary motor. This leads to great practical advantages such as an improved efficiency, a reduced size and weight and a lower production cost.

Further, according to the present invention, there is provided a motor using a resonater of gravity center revolution type whose center of gravity is adapted to rotate counterclockwise or clockwise upon excitation of a disc-shaped, annular or cylindrical piezoelectric device in its first-order resonance with reference of the breathing mode as the zero order. In this resonater of gravity center revolution type, two regions into which the device is equally divided along the diameter thereof are polarized into opposite polarities. A common electrode covers on the substantially whole surface of the back side thereof, and the two equally-divided electrodes cover on the positive and negative regions on the front side thereof to make up a four-electrode configuration of a two-pair four-pole revolving stator.

In this two-pair four-pole resonater with the earth electrode arranged outward, such an accident as an electrical shock by the applied voltage or the shorting of the electrodes is prevented. The greatest practical advantage of this two-pair four-pole resonater, however, is that only three wires including the earth line are required, unlike in the simple "piezoelectric revolving resonater" shown in FIGS. 1 and 2 which is composed with eight electrodes and thereby requires eight lead wires and has a complicated wiring arrangement.

Further, the stator according to the present invention is so constructed as to utilize the rotational torque which is received through a frictional force by a rotor pressed against a resonater of gravity center revolving type with the center of gravity thereof in revolution in the clockwise or counterclockwise direction.

The present invention thus has a stator itself effecting an effective rotation (revolution around the fixed center) differing from a conventional construction of an ordinary ultrasonic motor utilizing the rotational torque in which a rotor in pressure contact with the stator subjected to elliptical vibrations receives through a frictional force. As a result, torque may be transmitted by use of rolling friction, and the surface slide is hard to occur, thereby facilitating wear prevention. Further, the construction is very simple conveniently for reducing the thickness. In addition, a large output torque is generated, thereby loading to a conspicuous practical effect of a higher energy efficiency.

Figure 35:
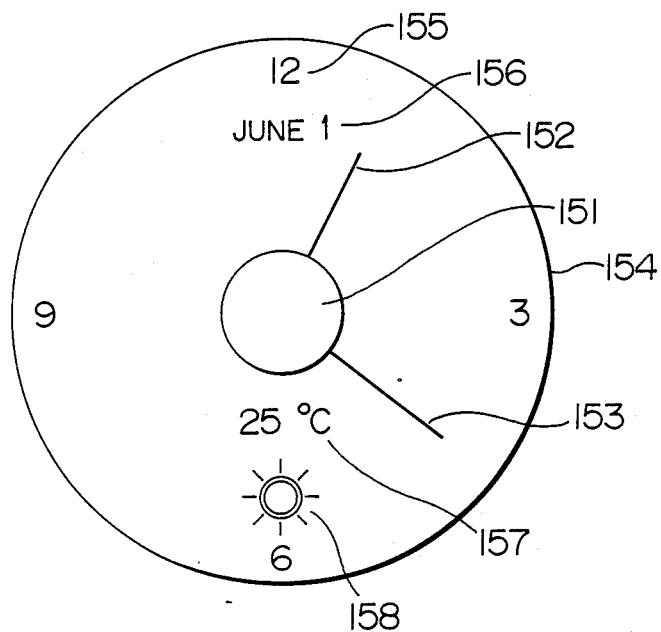
FIG. 35 is a diagram for explaining a clock using an ultrasonic motor according to another embodiment of the invention.
Figure 36:
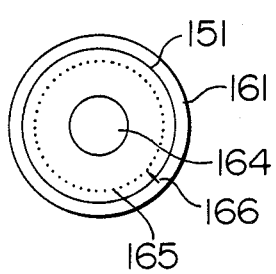
FIG. 36 is a plan view showing a contact mechanism of the clock shown in FIG. 3.
Figure 37:
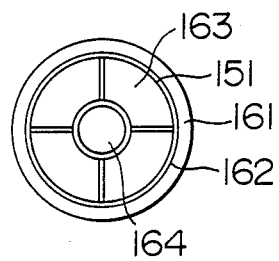
FIG. 37 is a rear vie of an ultrasonic motor of four-pole-pair revolving resonator of the clock.

Another embodiment of a clock using an ultrasonic motor is shown in FIG. 35 Numeral 151 designates a clock hand drive section with the internal mechanism other than the case illustrated in FIGS. 36 and 37. FIG. 36 shows a plan view, and FIG. 37 a rear view. As shown in FIG. 36, the front side includes a plurality of positioning signal contacts 165 and a slider 166, while an ultrasonic motor of four-pole revolving resonator type 162 is arranged on the back side thereof.

Figure 38:
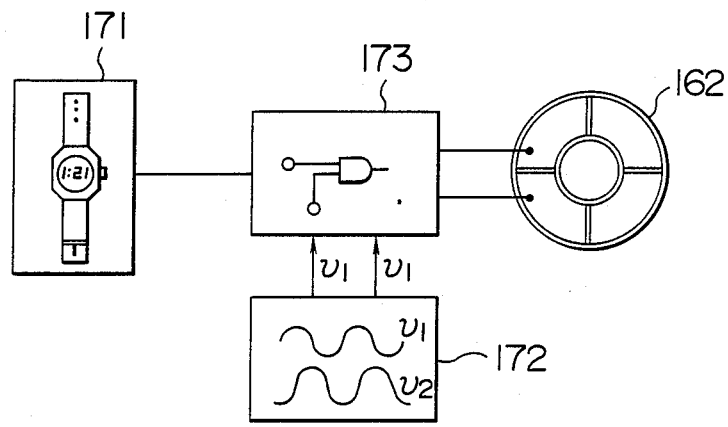
FIG. 38 is a block diagram showing a clock drive circuit according to an embodiment of the invention.
Figure 39:
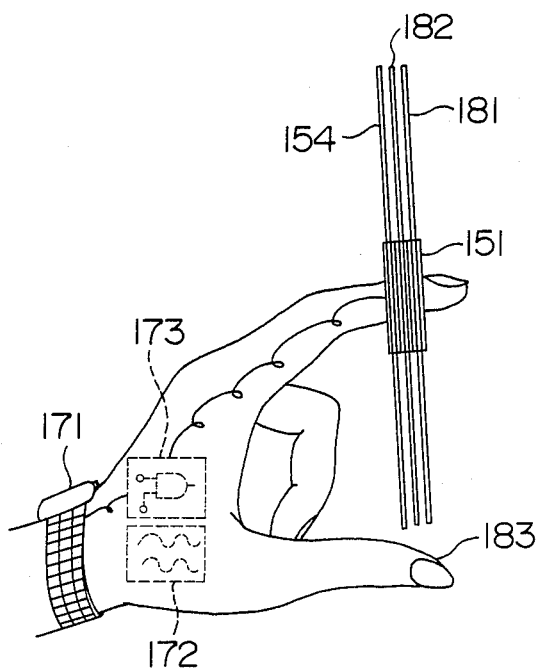
FIG. 39 is a diagram for explaining an embodiment of the present invention in which the clock is designed as an ornament.

FIG. 38 is a circuit block diagram showing a clock mechanism. This embodiment provides an analog clock including a minute hand and an hour hand as shown in FIG. 35. Numeral 151 designates a positioning drive section for the time indication hands, including two independent systems for the minute and hour hands. The hour hand 152 and the minute hand 153 are plotted separately from each other on a pair of transparent sheets (such as of glass or acryl). In this embodiment, a gold-plate glass disc 154 200 mm in outer diameter and 1 mm thick is used. The disc 154 has at its central part a hole with an inner diameter of 50 mm fixedly fitted with a ring 161 of polyimide mold 50 mm in outer diameter, 40 mm in inner diameter and 2 mm thick in contact with the motor. A pair of four-pole revolving resonators with a bolt 164 passed through the center thereof are concentrically fixed on the front and back of a transparent dial 182. The polyimide mold ring 161 has a slider 166. The hour hand plate 154 and the minute hand plate 181 are set on the dial 182 in such a way that the slider 166 is in contact with the 60 clock-positioning contacts 165 fixed on the dial 182. A clock with an ultrasonic motor is thus constructed.

Both the hour hand 154 and the minute hand 181 are transparent and are capable of indicating the time in accordance with the indication on the dial 182 as they are set in the drive section 151.

Now, the operation for setting the time will be explained. As the same principle applies to both the hour hand 154 and the minute hand 181, the explanation that follows will be made of the minute hand 181 alone. A clock drive control circuit is shown in FIG. 28. A drive power supply 172 for the ultrasonic motor 162 is a two-phase voltage source with motor frequency $f_0$ for producing two-phase voltages $v_1$ and $v_2$ of phases 90° apart from each other in the form of sinusoidal wave, rectangular wave or triangular wave. One of the outputs $v_1$ and $v_2$ is connected directly to the terminal of the motor 162 to excite two of the four electrodes. The other output is distributed through the distributor 173 among 59 of the 60 contacts 165, the remaining one being grounded.

The earth contact shifts sequentially from one to another adjacently of the 60 contacts in synchronism with a "minute" clock pulse of the digital watch 171. Specifically, one of the 60 contacts is always grounded, and the grounded contact shifts sequentially by a clock pulse. In response to a carry signal for transfer of the time on the digital watch from 59 minutes to zero minute, the grounded contact on the dial also shifts to the 0-minute position by the carry operation of the distributor, so that the grounded contact shifts in synchronism with the watch on the dial.

When the central hole of the minute hand plate 181 is set on the outer periphery of the minute hand drive ultrasonic motor 12, the weight of the minute hand plate 181 exerts a pressure with the motor 162, with the result that the minute hard plate 181 is rotated by the power supplied through the slider 166. When the slider 166 comes into contact with the grounded contact, however, the motor 162 ceases to be excited and the minute hand plate 181 stops at a position indicating the present time. Subsequently, the minute hand continues accurate indication of the time as instructed by the watch in synchronism with the clock pulse.

In this embodiment, a watch is divided into a timing function and an indication function. The former is taken charge of by conventional accurate quartz watch, and the latter by the positioning mechanism of an ultrasonic motor. It is therefore not necessary any longer to keep the revolutional speed of the ultrasonic motor constant, thus realizing a low-cost high-fashion watch with a motor as thin as 2 mm.

Further, the watch disclosed in this embodiment is thin, easily legible and presents an appearance of high fashion. In addition, a simple construction reduces troubles. Furthermore, the transparent disc plotted with the watch hands may be easily removed for cleaning, thereby providing an ornament which is easier to handle than a mobile clock hard to clean. Still another advantage of this clock is that the right time is automatically indicated simply by setting the removed disc such as the minute hand plate in a motor.

Generally, a quartz clock is so accurate that its annual error is approximately several seconds. Once the time is set, therefore, it continues to operate accurately for several years. During that time, the hands may be cleaned o carried and set in the motor. Then, the right time is indicated automatically for convenient operation.

Figure 40:
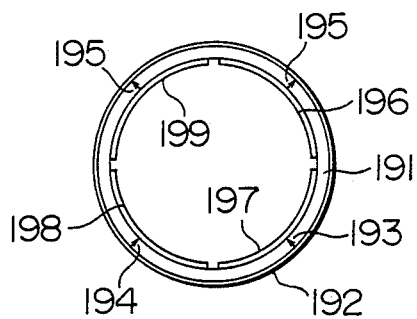
FIGS. 40 and 41 are plan and front views respectively for explaining the principle of operation of a cylindrical piezoelectric four-pole revolving resonator according to an embodiment of the present invention.
Figure 41:
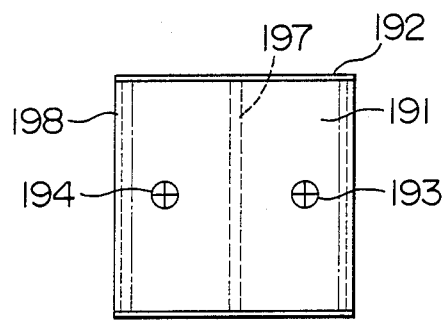

Now, an embodiment of the cylindrical piezo-electric resonator of four-pole type is shown in FIGS. 40 and 41. The whole outer peripheral surface except for an insulating band 1 mm wide along vertical direction of a cylindrical piezoelectric device 191 40 mm in diameter, 2 mm thick and 40 mm long made of a $Pb(ZrTi)O_3$ ceramics, has electrodes 192 arranged thereon, and the inner peripheral surface thereof has electrodes 196, 197, 198 and 199 divided into four parts. Of all these electrodes, the electrodes 196, 199 and 197, 198 are connected in common respectively, and are impressed with positive and negative DC high voltages respectively for polarization. The arrows 193, 194 and 195 in FIG. 40 indicate the direction of polarization. As seen, a semicylinder is polarized outward, and the remaining semicylinder inward.

Figure 42:
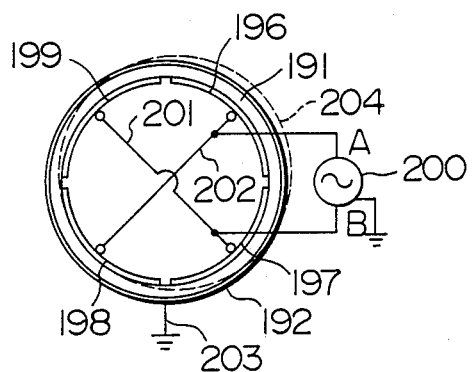
FIG. 42 is a diagram for explaining a modification of the resonator.

An electrode 192 of a piezoelectric revolving resonator thus completed is connected with a grounding lead wire 203 as shown in FIG. 42, and the electrodes 196, 198 and the electrodes 197, 199 are connected to the earth in common by lead wires 202 and 201 respectively. Outputs A and B with phases 90° opposite to each other and 45 KHz and 50V are applied from a two-phase oscillator 200 between these elements and the earth. Under this condition, the piezoelectric device 191 is impressed with a revolving magnetic field of 45 KHz, so that the cylindrical piezoelectric device 191 is deformed as shown by a dotted line 204 at each moment. This deformation makes a revolution along the circumference during one cycle of 45 KHz. As a result, the gravity center of the piezoelectric cylinderical device makes 45000 revolutions per minute with a radius of several tens of pm around the cylinder axis. The device vibration and the rotational radius reach a maximum for the frequency of the applied voltage at 45 KHz. In the meantime, a maximum current of 0.5 A flows, thus realizing a strong piezoelectric resonator of 25 VA in power. In addition, since one side is provided with an electrode over the entire surface therefor, thereby enabling one side to be fixedly grounded. Further, only two lead wires are required to connect each two of the four electrodes on the other side in common, thus simplifying the wiring operation.

According to this embodiment, a cylindrical piezoelectric revolving resonator is polarized along the diameterical direction, that is, a cylindrical member is radially polarized in such a manner that two semicylindrical regions divided along the diameter are polarized to mutually opposite polarities and one of the outer and inner peripheral surfaces of the cylinder has electrodes arranged on substantially the whole surface thereof, while the surface has positive and negative areas each divided into two equal parts and arranged with electrodes. As a result, once a frequency is determined, the diameter is automatically determined, while the length of the cylinder is not limited. Thus with the increase in length, the input impedance is reduced thereby to reduce the driving voltage of the piezoelectric revolving resonator with an increased amplitude of ultrasonic vibration, thus increasing the strength of the resonator.

Figure 43:
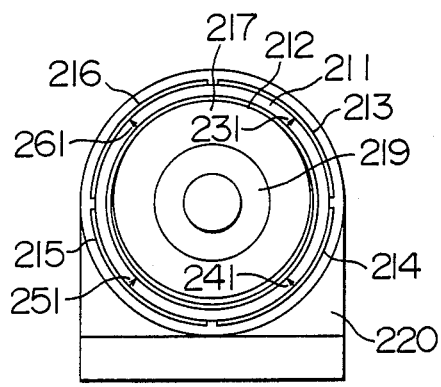
FIGS. 43 and 44 are diagrams for explaining the principle of operation of a cylindrical ultrasonic four-pole motor according to an embodiment of the present invention.
Figure 44:
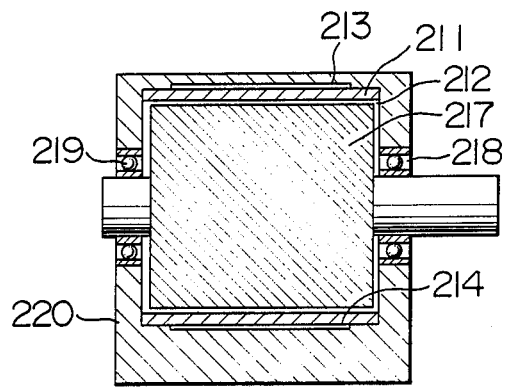
Figure 45:
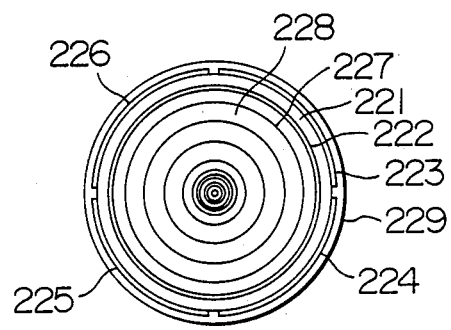
FIG. 45 is a diagram for explaining the principle of operation of another embodiment of the invention.

FIGS. 43, 44 and 45 show an embodiment of a cylindrical ultrasonic four-pole motor realized by use of a cylindrical piezoelectric revolving resonator.

A cylindrical four-pole piezoelectric revolving resonator 1 made of a $Pb(ZrTi)O_3$ piezoelectric ceramics has an earth electrode arranged over the whole inner surface thereof, and the electrode surface thereof plated with hard chromium. As shown in FIG. 43, the outer peripheral surface is provided with cylindrical electrode quarters 213, 214, 215 and 216 and connected with lead wires. This ceramics cylinder is polarized radially along the diametrical direction thereof in advance, the polarization being directed outward (231, 261) for the semicylindrical portions and inward (241, 251) for the semicircumferential portions. This cylindrical four-pole piezoelectric revolving resonator 211 has one-tenth portions of the ends thereof fitted in a casing 220 along the length thereof, and the other outer peripheral portions of the revolving resonator 211 are formed with a clearance of about 50 μm in length with the casing 220. The cylindrical revolving resonator 211 has fitted therein a rotor 217 10 to 50 mm in diameter, 38 mm in small diameter and 40 mm long with shafts at the ends thereof. The shafts are supported on bearings 218 and 219 pressured into a casing 220. The lead wires are adapted to short the electrodes 211, 215 and the electrodes 214, 216 respectively, each being connected to the terminals A and B of the two-phase driving power supply respectively. The terminals A and B produce sinusoidal waves with the same amplitude and frequency against the earth terminal and π/4 apart in phase from each other. With the connection of the lead wires, therefore, a revolving electric field is applied to the cylindrical four-pole piezoelectric revolving resonator.

When the frequency is set to the primary resonant frequency of the cylindrical revolving resonator 211, or 45 KHz in the case under consideration, the amplitude is increased and the gravity center of the cylinder rotated. As a result, the gravity center of an object inscribed on the inner circumference of an annular member is moved along an eccentric circle in radial direction, so that the rotor 220 is driven vigorously on the principle of the hula-hoop according to which an annular member circumscribed on the object is rotated. The direction of rotation of the rotor 220 is reversed when the relative speeds of A and B are reversed.

FIG. 45 is a diagram for explaining the principle of operation a cylindrical ultrasonic four-pole motor in the form of cylindrical rotor doubling as a lens body tube according to another embodiment of the present invention. The cylindrical four-pole piezo-electric revolving resonator 221 set in a fixed ring 229, which has the same configuration as the one shown in FIG. 43, will not be described. The earth electrode on the inner periphery is not chromium-plated but fitted with an aluminum cylinder 1 mm thick and has the inner peripheral surface thereof threaded at pitches of 0.5 with the surface thereof plated with hard chromium. The holding ring 227 of the lens 228 has the outer peripheral surface thereof formed with a mating thread. Thus, when a screw is fitted and the ring 227 turned, the lens moves forward or rearward along the optical axis. If a revolving electric field is applied in the manner mentioned in FIG. 43 instead of manually rotating the ring 227 of control the phases, the lens is fed longitudinally. Because of a large torque, even a body tube built in with a large-diameter composite lens can be easily driven. Also, the displacement resolution in the order of microns makes possible quick fine setting of the focal point. In addition, the large holding power at the set position prevents a defocussed state under a vibration.

In FIG. 45, numeral 222 designates the earth electrode, numerals 223, 224, 225 and 226 electrodes, and numeral 229 a fixing frame.

In this embodiment, the primary-mode vibration can be excited along the circumference, making up a motor with a rotor pressured against the that side of a four-pole piezoelectric revolving resonator covered with electrodes over the whole surface thereof, so that the grounded rotor can be pressed against the electrode surface, thereby simplifying the construction. Further, even in the case of a motor small in diameter and high in drive frequency, the rotor may be lengthened with a side area of the piezoelectric member and low input impedance, while at the same time increasing the motor torque. The rotor may be either circumscribed or inscribed on the stator. In the case where it is inscribed, the rotor may be formed in pipe to produce a motor for driving a body tube for increased applications to optical equipment.

I claim:

1. A piezoelectric revolving resonator comprising an ultransonic resonator device, in which the center of gravity of a circular resonator device is moved to revolve eccentrically around the center of the original circle under the resonance when the circular resonator device is excited with first order resonance frequency, said circular resonator device being in the form of an selected one of disc-shaped, annular and cylindrical piezoelectric devices having an even number of circumferentially equally divided regions excitable independently, said circular resonator device being excited in such a manner that the regions arranged symmetrically with respect to the center thereof are vibrated in opposite phases to each other, and the regions arranged adjacently to each other are vibrated in phases different to each other, the regions expanding and contracting in the radial direction of the circular resonator device so as to enable eccentric revolution of the center of gravity of the circular resonator device.

2. A piezoelectric revolving resonator according to claim 1, wherein the circular resonator device takes the form of a composite resonator including selected one of disc-shaped, annular and cylindrical elastic members combined with a piezoelectric device along the diametrical direction thereof for exciting the elastic member.

3. In a piezoelectric resonator of center of gravity revolution type with the center of gravity thereof resolving reversibly in counterclockwise and clockwise directions upon excitation of a selected one of as disc-shaped, annular and cylindrical piezoelectric devices in its first order-resonance with the reference of the breathing mode as zero order, a four-pole piezoelectric revolving resonantor wherein two equal circumferential regions into which the device is divided by the diameter thereof are polarized in mutually opposite polarities, a common electrode is covered on substantially the whole back surface, and two equally divided electrodes are covered in positive and negative regions on the front surface thereof so that the regions expand and contract in the radial direction to enable their center of gravity to eccentrically revolve.

4. A two-pair four-pole piezoelectric revolving resonator comprising a four pole piezoelectric revolving resonator which is excited in such a manner that the back electrode is ground, two common terminal plates each of which connects electrically between a pair of electrodes arranged symmetrically with respect to the center are impressed with two-phase signals of 90° difference in phase supplied from an electric power source, the revolving resonator being in the form of a selected one of a disc-shaped and annular circular piezoelectric device having an even number of circumferentially equally divided regions, the regions expanding and contracting in a radial direction so as to enable eccentric revolution of a center of gravity of the circular resonator device.

5. A two-pair four-pole revolving piezoelectric resonator according to claim 4, where piezoelectric device is pressure fitted on the inner peripheral part of a ring of elastic material with a small ultrasonic loss.

6. A two-pair four-pole revolving piezoelectric resonator according to claim 4, wherein the piezoelectric electric device is pressure fitted on the inner peripheral part of a ring of elastic material with a small ultrasonic loss, the back electrode of the device is grounded, four front electrodes are impressed with electrical signals of ultrasonic bands 90° different from each other in phase, and vibrations thus generated are resonantly amplified in the primary mode of the elastic ring.

7. A piezoelectric revolving resonsator comprising a cylindrical piezoelectric device divided into an even number of regions with the same area arranged along the circumference and deformable independently of each other, the regions arranged symmetrically with respect to the center being excited in opposite phases, the regions adjacently arranged being excited in different phases, with the result that the first order resonance vibration of the cylindrical piezoelectric device is caused with the breathing mode as the zero order thereby to rotate the center of gravity thereof, in which two regions of the device equally divided along the diameter thereof are radially polarized into opposite polarities to each other, one of the outer and inner peripheral surfaces of the cylinder is covered with an electrode over the entire surface thereof and the other of the surfaces has positive and negative areas each having two equally-divided electrodes, the regions being expanded and contracted in a radial direction to enable eccentric rotation of the center of gravity of the cylindrical piezoelectric device.

8. A piezoelectric revolving resonator according to claim 7, further comprising an elastic cylinder with a small ultrasonic loss along selected one of the outer and inner peripheral surfaces of the cylindrical piezoelectric device.

9. An ultrasonic motor comprising a piezoelectric revolving resonator with the center of gravity thereof rotating and a rotor pressed against the resonator and receiving a rotational torque through the friction force, wherein said piezoelectric revolving resonator is a cylindrical piezoelectric device with the breathing mode as zero order, the device being polarized radially in such a way that two circumferential regions equally divided along the diameter thereof have opposite polarities, a selected one of the outer and inner peripheral surfaces is entirely covered with an electrode, while the other surface thereof has positive and negative regions arranged with electrodes equally divided along the periphery thereof, said resonator making up a cylindrical four-pole revolving piezoelectric resonator capable of exciting a vibration of the first order resonance, the regions being expanded and contracted in a radial direction so as to enable the center of gravity to rotate eccentrically.

10. An ultrasonic motor according to claim 9, wherein selected one of cylindrical and hollow cylindrical rotor is pressed directly against that side of the cylindrical four-pole revolving piezoelectric resonator which are covered with electrodes over the whole surface thereof, said rotor being alternatively pressed against a cylindrical elastic member of a composite cylinder in the case where the cylindrical elastic member is fitted on said side covered with electrodes.

* * * * *